United States Patent Office 3,704,094
Patented Nov. 28, 1972

---

3,704,094
PROCESS FOR THE PRODUCTION OF ELEMENTAL SILICON
Richard Joseph McClincy, Lewiston, James Herbert Downing, Clarence, and Benjamin John Wilson, Youngstown, N.Y., assignors to Union Carbide Corporation, New York, N.Y.
No Drawing. Original application Nov. 19, 1969, Ser. No. 878,229, now Patent No. 3,660,298. Divided and this application Jan. 19, 1972, Ser. No. 219,114
Int. Cl. C01b 33/02
U.S. Cl. 423—350
3 Claims

ABSTRACT OF THE DISCLOSURE

A low density stoichiometric agglomerated furnace charge for use in the carbothermic reduction of silica in electric type furnaces according to the overall reaction of $SiO_2 + 2C \rightarrow Si + 2CO$. The charge comprises a fine fraction and a coarse fraction of particulated silica homogeneously mixed with a particulated carbon and a low density filler to provide an overall average bulk density of between about 20 and 50 pounds per cubic foot.

---

This is a division of application Ser. No. 878,229 filed Nov. 19, 1969, now U.S. 3,660,298 issued May 2, 1972.

BACKGROUND OF THE INVENTION

Field of the invention

This invention relates to the process for and the furnace charge used in the carbothermic reduction of silica in electric furnaces according to the overall reaction of $SiO_2 + 2C \rightarrow Si + 2CO$. The furnace charge is a low density stoichiometric agglomerate composite comprising a fine fraction and a coarse fraction of particulated silica and a particulated carbon mixed with a very low density filler so that the overall agglomerate charge will have an average bulk density of between about 20 and 50 lb./cubic ft.

DESCRIPTION OF THE PRIOR ART

Silicon metal is produced in electric-arc type furnaces by the reduction of silica by a carbonaceous reducing agent yielding silicon metal and carbon monoxide gas.

In the commercial production of silicon a mix comprising a loose mixture of siliceous minerals, particularly quartz, and a carbonaceous reducing agent, such as coke or coal, is used as the furnace charge. The charge so made is fed into the top of an electric furnace having vertically disposed electrodes which develop heat in such a way that a temperature gradient exists between the upper and lower portions of the furnace. It is known that the reduction of $SiO_2$ by means of carbon involves the following reactions:

(1)          $SiO_2 + C \rightarrow SiO + CO$
(2)          $SiO + 2C \rightarrow SiC + CO$
(3)          $2SiO_2 + SiC \rightarrow 3SiO + CO$
(4)          $SiO + SiC \rightarrow 2Si + CO$ In the course of these reactions in an electric furnace it has been found that a large amount of gaseous SiO formed from reactions 1 and 3 recirculates between the upper and lower portions of the furnace. Disproportionation of this gaseous SiO leads to a cyclic reduction of silicon dioxide according to the reaction:

(5)          $2SiO \rightarrow Si + SiO_2$

This reduction is called cyclic because $SiO_2$ is used in equation 1 to form SiO which in turn is used in equation 5 to form $SiO_2$ so that in effect we are back where we started from for at least a portion of the $SiO_2$ initially charged to the furnace. This cyclic occurrence needlessly increases the energy consumption required to produce silicon since the reaction is exothermic and is not required.

It has been noted that the disproportionation of silicon monoxide occurs on the surface of the solid charge which partially restricts the gas penetration therein, thus these unreacted charges accumulate in the upper portion of the furnace and require a frequent stoking for proper operation of the furnace.

The use of an agglomerate furnace charge has been tried but with disappointing results. It seems that a pasty fusion is produced on the charges in the top portion of the furnace which impedes the passage of the gases therethrough thereby resulting in troublesome eruptions of combustible gas charged with silicon monoxide while a layer of silicon carbide forms in the lower portion of the furnace. This led to irregular furnace operation, higher electrical energy consumption and a decrease in recoverable silicon.

Charging the furnace with pellets or briquettes composed of molded bodies of finely divided silicon dioxide homogeneously mixed with an amount of carbonaceous material required for reducing of the silicon dioxide have been tried but again the results were disappointing, i.e., relatively low silicon yield. An improved type of pellet or briquette was disclosed in U.S. Pat. No. 3,218,153 wherein a core containing an excess of silicon dioxide with respect to a carbonaceous reducing agent was surrounded by a second layer or shell containing an excess of carbonaceous reducing agent with respect to the silicon dioxide. Again the yield of silicon metal was found to be relatively low.

Another attempt for efficiently increasing the yield of silicon was disclosed in French Pat. No. 1,530,655 wherein two-thirds of the stoichiometrically required silica and all of the carbonaceous reducing agent are intimately mixed in the form of agglomerates with the remainder of the silica being charged in fragments separate from the agglomerates. Although this technique showed an improvement in the silicon yield over the use of a totally loose mix furnace charge, the separate addition of the silica fragments led to segregation of the silica from the carbonaceous reducing agent within the furnace which resulted in an irregular and inefficient furnace operation.

SUMMARY OF THE INVENTION

Broadly speaking, this invention substantially eliminates the recirculation of gaseous silicon monoxide attributed to its disproportionation within electric arc furnaces. This is accomplished by using a low density stoichiometric agglomerate furnace charge, such charge comprising a fine fraction and a coarse fraction of particulated silica, particulated carbonaceous reducing agent, and a suitable bulking agent all mixed to yield an average bulk density of between about 20 and 50 lb./cu. ft. and preferably 25 lb./cu. ft. In order words an agglomerate is provided wherein the amount of silica and carbon is such that complete reaction of these constituents will provide silicon metal and carbon monoxide.

The following reaction represents the stoichiometric reduction of silica with carbon to produce silicon metal:

(6)          $SiO_2 + 2C \rightarrow Si + 2CO$

However in an electric furnace operation the reaction actually proceeds in steps wherein two intermediate products are formed during the process. These are silicon monoxide and silicon carbide. For example when the charge of silica and carbon is fed into the furnace, the silica reacts with the carbon in the upper portion of the furnace where the temperature is lowest and on the order of 1800° C. or less. The overall reaction under these conditions is as follows:

(7) $$3C + SiO_2 \rightarrow SiC + 2CO$$

In the lower portion of the furnace where the temperature is highest and on the order of about 2000° C. the reactions which occur are principally:

(8) $$2SiO_2 + SiC \rightarrow 3SiO + CO$$
(9) $$SiO + SiC \rightarrow 2Si + CO$$

The CO formed in the high and low temperature areas of the furnace passes up through the furnace charge and exits out of the top of the furnace while the SiO, in a gaseous state, ascends to the upper portion of the furnace where it disproportionates at a temperature on the order of 1800° C. as follows:

(10) $$2SiO \rightarrow Si + SiO_2$$

If this reaction, indicated as Formula 10, occurs to a substantial extent then there is a tendency for the SiO₂ and Si to cement the charge materials into a pasty mass. There is also a tendency for the SiO to react with CO in the upper portion of the furnace to produce SiO₂+C (or SiC). The products of these exothermic reactions are sticky composites that tend to stick in the top of the furnace thereby resulting in inefficient furnace operation by preventing gas from flowing therethrough. The SiO also has a tendency to react with C as follows:

(11) $$SiO \rightarrow 2C + SiC + CO$$

This is actually desirable since the products formed are not sticky composites and the reaction provides a preferred way of trapping SiO and preventing it from exiting out of the furnace along with gaseous CO. To insure this reaction and avoid the reaction of Equation 10, a large amount of reactive carbon surface has to be available at the upper portion of the furnace where the temperature is on the order of 1800° C. or less.

In the lower portion of the furnace where Reactions 8 and 9 occur, the SiC will form deposits when sufficient SiO₂ and SiO are not available. Thus a sufficient amount of unreacted SiO₂ is required at the lower portion of the furnace.

The agglomerate charge prepared according to this invention effectively reduces the large recirculating load of gaseous SiO by more efficiently utilizing it in the reaction shown by Equation 9 since SiC will be produced in a form that can readily react with SiO at high temperatures to provide Si and CO.

To prepare a furnace charge according to the invention, a mix is prepared from finely ground particles of a carbonaceous reducing agent, coarse particles of silica, finely ground particles of silica and a bulking agent. The finely ground fraction of particulated silica should be of sufficient quantity to react with all the carbon present to form silicon carbide as identified in Equation 7 while the coarse fraction should be of sufficient quantity to react with all the silicon carbide thus formed to form silicon as identified in Equations 8 and 9. This requires that the ratio by weight of fine silica to coarse silica should be between about ½ and about 2.

The mixture is then agglomerated by any means suitable using a binder material so as to produce a final product with a bulk density of between about 20 and about 50 lb./cu. ft., preferably about 25 lb./cu. ft. and being sufficiently solid so that it can be handled by mechanical means without disintegrating.

The choice of a low density filler material is arbitrary and should depend on such factors as availability, cost, chemical purity, ease of use and carbon content. The primary requirement is that it is sufficiently low in density so that when added to the other elements in the mixture the final product will have a bulk density of between about 20 and about 50 lb./cu. ft.

The size of the coarse fraction of particulated silica should be between about ⅛″ and ½″ while the fine fraction should be small enough to substantially pass through a 48 mesh screen and finer. Preferably the fine particles should be about 100 mesh or finer.

The coarse fraction should comprise between about 33 and about 67 percent of the SiO₂ charged while the fine fraction should comprise between about 67 and about 33 percent of the SiO₂ charged.

The carbonaceous reducing agent may vary in size but a 100 mesh or finer is preferable. Coal, coke and the like are suitable carbonaceous reducing agents and should be present in an amount to satisfy the stoichiometric requirement for reducing SiO₂ as expressed by Equation 6.

In furnace operations where a portion of the silicon and/or its oxides are lost with the fumes leaving the top of the furnace it may be advantageous to vary the amount of the carbonaceous reducing agent to between about 85 and about 100 percent necessary for satisfying the stoichiometric requirement for reducing SiO₂. On the other hand when a portion of the carbonaceous reducing agent is burnt upon being initially fed into the furnace then an amount between about 100 and about 115 percent necessary for the stoichiometric requirement for reducing SiO₂ should be used.

A suitable binder exclusive of solvent may be added to the agglomerated mixture in an amount equal to or less than 10 percent of the furnace charge.

The overall size of the agglomerate may vary widely depending on the size of the furnace being used. It is suggested, however, that the length in one direction be limited to insure complete reaction of Equation 7 in the upper portion of the furnace where the temperature is lowest. This will occur by exposing a sufficient surface area of the charge to the high temperature environment existing in the upper portion of the furnace. With one direction of the charge being limited in length, the proper surface area of the charge can be obtained.

The blending together of fine and coarse fractions of particulated silica with a particulated carbon, low density filler and a binding agent produced a stoichiometric, low bulk density agglomerated silicon metal mix for use in electric-arc furnaces for the efficient production of silicon metal according to the reaction SiO₂+2C→Si+2CO. When the low density agglomerates are fed into the furnace, the bulk of the finely ground fraction of silica reacts with the carbonaceous agent to form silicon carbide and carbon monoxide in the upper furnace zone where the temperature is relatively low and on the order of 1800° C. The bulk of the coarse fraction of silica descends to the lower zone of the furnace where the temperature is relatively high and on the order of 2000° C. Here the coarse fraction of silica reacts with the silicon carbide produced in the lower temperature, higher portion of the furnace to form silicon monoxide which further reacts with silicon carbide in the higher temperature, lower portion of the furnace to form silicon metal thus eliminating the escape of SiO to the upper portion of the furnace. The increased yield of silicon obtained by using this stoichiometric agglomerate furnace charge is due in part to a substantial elimination of the large recirculating load of gaseous SiO by reducing the reaction of Equation 5 as a result of more efficiently utilizing SiO in the reaction shown by Equation 9. This also decreased the energy consumption required for the production of silicon metal.

EXAMPLE

A substantially stoichiometric agglomerated furnace charge for the carbothermic reduction of silicon in a 40-kw., two-electrode, single-phase electric furnace was prepared by blending together the following materials:

(1) 37.0 parts by weight of a fine fraction of silica substantially 200 mesh or finer.

(2) 28.1 parts by weight of a coarse fraction of silica about ¼ inch by ⅛ inch size.

(3) 28.2 parts by weight of East Gulf coal (containing 80% fixed carbon) ground to substantially 200 mesh or finer.

(4) 6.6 parts by weight of dry straw about one inch size.

(5) 30.0 parts by weight of a binder solution comprised of 7% of lignin solids and 93% of water.

The above materials were preblended and fed to a 6-inch diameter, auger-type extruder to produce ⅝-inch square extrusions of varying lengths of up to 4 inches. After thorough drying, the mix was found to have a bulk density of about 25 lbs./cu. ft. The dried mix was fed to a 40-kew., single phase electric furnace comprised of a properly insulated 10-inch diameter by 10-inch deep graphite crucible. The furnace was used in conjunction with two vertically disposed, 1½ inch diameter discontinuous graphite electrodes. A typical smelting test involved approximately 8 hours of continuous operation. For comparison sake, silicon metal was produced using the identical furnace and process as stated above except that a conventional loose mix and a variety of prepared agglomerated mixes were substituted for the stoichiometric agglomerate charge prepared according to this invention. Table I shows the compositional make-up of the substituted mixes. Mix A represents a conventional loose mix charge. Mix B was essentially the same as the mix described in the example except that the coarse quartz fraction was added to the furnace loose rather than being combined with the other ingredients in the extruded agglomerates. The extruded agglomerates were preblended with the loose, coarse quartz and fed to the furnace together. Mix C represents a stoichiometric agglomerate prepared by conventional pelletizing techniques on an inclined, disc-type pelletizer. Mix D represents a mix prepared according to this invention.

In Table II, the electrical energy consumption per pound of silicon produced is shown along with the percent of silicon recovered for each type of furnace charge. The data represent averages for all furnace taps made following the initial start-up period which was held constant for a period of 4 hours and comprised the first two taps. As can be seen from Table II the charge prepared in accordance with this invention had the highest percent silicon recovered while utilizing the lowest amount of electrical energy. The use of lower electrical energy coupled with the highest recovery of silicon also results in a considerable reduction in electrode consumption.

The improved results are due to the localized homogeneity of the agglomerates which contains a substantially stoichiometrically balanced mixture of $SiO_2$ plus carbon that ensures the efficient utilization of the intermediately produced SiO in the reaction shown in Equation 9. In addition some unreactive $SiO_2$ is encapsulated within the pellet thereby delaying the reaction of this $SiO_2$ until it reaches the lower, highest temperature zone of the furnace thus making the final metal-producing step of Equations 8 and 9 more efficient.

The process for and the charge used in the carbothermic reduction of silica in an electric furnace as specified should in no way limit the scope of the present invention as offered by the appended claims.

Mesh sizes referred to in this specification and claims are in reference to the Tyler screen mesh sizes.

TABLE I

| Mix | Quartz Weight percent | Quartz Size | Quartz Weight percent | Quartz Size | East Gulf coal Weight percent | East Gulf coal Size | Straw Weight percent | Straw Size | Wood chips Weight percent | Wood chips Size | Agglomerate bulk density lb./cu.ft. |
|---|---|---|---|---|---|---|---|---|---|---|---|
| A | 58.1 | ½″×¼″ | | | 23.9 | ½″×¼″ | | | 18.0 | 1½″×½″ | |
| B | 38.5 | 200M×D* | 27.5 | ¼″×⅛″ | 23.9 | 200M×D* | 5.1 | ½″×D | | | 24 |
| C | 37.3 | 200M×D* | 28.0 | ¼″×⅛″ | 28.1 | 200M×D* | 6.6 | ½″×D | | | 35 |
| D | | | | | Prepared as shown in the example | | | | | | |

* M×D means mesh size and finer.

TABLE II

| Mix | Volts | Amp | Kwh. | Kwh./h. | Kw. | Kwh./lb. Si | Percent Si recovered |
|---|---|---|---|---|---|---|---|
| A | 68 | 518 | 126 | 35.8 | 35.8 | 11.85 | 61.7 |
| B | 68 | 527 | 152 | 38.9 | 39.7 | 9.97 | 70.3 |
| C | 69 | 554 | 148 | 40.5 | 40.2 | 9.80 | 69.7 |
| D | 71 | 533 | 123 | 37.8 | 39.2 | 7.92 | 76.7 |

What is claimed is:

1. In the process for the electric arc furnace production of silicon by the reduction of silica with carbon, the improvement which comprises using a furnace charge, which charge comprises an agglomerated homogeneous mixture of a particulated carbonaceous reducing agent, particulated silica, a bulking agent, and a binder, wherein the fixed carbon contents of said carbonaceous reducing agent comprises between about 85 and 115 percent of the amount stoichiometrically required with the reaction:

$$SiO_2 + 2C \rightarrow Si + 2CO$$

wherein said silica comprises a fine fraction and a coarse fraction, wherein said fine fraction of silica is substantially sized 48 mesh and finer and said coarse fraction is sized between about ⅛ inch and about ½ inch and the ratio by weight of the fine fraction to the coarse fraction of silica being between about ½ and about 2, wherein said particulated carbonaceous reducing agent is sized 100 mesh and finer, wherein said binder comprises solids and a solvent with said solids being equal to or less than 10 percent by weight of the furnace charge, and wherein said charge has a density between about 20 and about 50 pounds per cubic foot.

2. The process of claim 1, wherein the fixed carbon contents of said particulated reducing agent of the furnace charge comprises between about 85 and about 100 percent of the amount stoichiometrically required for the reduction of silica in accordance with the reaction:

$$SiO_2 + 2C \rightarrow Si + 2CO$$

3. The process of claim 1 wherein said charge has a density of about 25 pounds per cubic foot.

References Cited

UNITED STATES PATENTS

| 745,122 | 11/1903 | Tone | 23—223.5 |
| 2,261,516 | 11/1941 | Franchot | 23—223.5 X |
| 3,215,522 | 11/1965 | Kuhlmann | 23—223.5 X |
| 3,218,153 | 11/1965 | Schei | 75—3 |

FOREIGN PATENTS

| 18,659 | 1899 | Great Britain | 23—223.5 |
| 1,530,655 | 6/1968 | France | 23—223.5 |

EDWARD STERN, Primary Examiner

U.S. Cl. X.R.

75—3, 10; 423—415